United States Patent [19]

Grinstead

[11] 4,254,087

[45] Mar. 3, 1981

[54] EXTRACTION OF COPPER, NICKEL AND COBALT USING ALKYLAROMATIC SULFONIC ACIDS AND CHELATING AMINES

[75] Inventor: Robert R. Grinstead, Walnut Creek, Calif.

[73] Assignee: The Dow Chemical Company, Midland, Mich.

[21] Appl. No.: 60,256

[22] Filed: Jul. 25, 1979

[51] Int. Cl.³ .................... C01G 3/00; C01G 51/00; C01G 53/00

[52] U.S. Cl. .................... 423/24; 423/139; 75/101 BE

[58] Field of Search ............ 423/24, 139, DIG. 14; 75/101 BE

[56] References Cited

U.S. PATENT DOCUMENTS

| | | | |
|---|---|---|---|
| 3,810,827 | 5/1974 | Kane et al. | 423/DIG. 4 |
| 3,843,667 | 10/1974 | Cupery | 423/24 |
| 3,878,286 | 4/1975 | Morin et al. | 423/24 |
| 3,941,793 | 3/1976 | Ackerley | 423/139 |
| 4,018,865 | 4/1977 | Gallacher | 423/24 |
| 4,100,163 | 7/1978 | Virnig | 423/24 |
| 4,123,435 | 10/1978 | Grinstead et al. | 423/24 |
| 4,166,837 | 9/1979 | Gallacher | 423/139 |

OTHER PUBLICATIONS

Donaldson et al., "Transmission of Substituent Effects in Quinoline", *J. Org. Chem.*, vol. 33, No. 4. Apr. 1968, pp. 1504–1506.

Charles et al., "Structure and Behavior of Organic Analytical Reagents", *Analytica Chimica Acta*, vol. 11 (1954), pp. 1–11.

*Primary Examiner*—Brian E. Hearn
*Attorney, Agent, or Firm*—James W. Ambrosius; Gary D. Street

[57] ABSTRACT

An extractant system comprising (a) a high molecular weight alkylaromatic sulfonic acid and (b) a chelating amine having a pKa of from about 3 to about 9 in a solvent which is essentially immiscible with water, said system being useful for the selective extraction of desired metals, e.g., cobalt, nickel or copper ions from aqueous acidic ore leach liquors.

10 Claims, No Drawings

EXTRACTION OF COPPER, NICKEL AND COBALT USING ALKYLAROMATIC SULFONIC ACIDS AND CHELATING AMINES

SUMMARY OF THE INVENTION

According to one embodiment of the present invention, there is provided an extractant system and process of using the same to selectively extract cobalt, copper or nickel from aqueous acidic ore leach liquors containing the same and having a pH of below about 3.0. The extractant system has superior selectivity and/or activity in the recovery of first metal values, e.g., cobalt, nickel and/or copper from mixtures with each other and/or other second metal values, such as aluminum, calcium, iron, magnesium and manganese and comprises (a) a high molecular weight alkyl aromatic sulfonic acid, (b) a chelating amine and (c) a solvent which is essentially immiscible with water. High selectivity ratios of the desired metals over the non-desired metals, e.g., a Cu:Fe ratio of about 2000 or more, can be obtained by use of the extractant system. The extractant system of the present invention also possesses highly advantageous properties in that cobalt and nickel can be selectively extracted from acid solutions below about pH 2 in preference to iron.

In another embodiment of the present invention, there is provided a process for recovering a first metal value selected from the group consisting of cobalt, copper and nickel from an acidic, aqueous ore leach liquor containing said first metal value and a second metal value, the process comprising (1) contacting said leach liquor at a pH of below about 3.5 with a solvent-extractant system comprising (a) a high molecular weight alkylaromatic sulfonic acid, (b) a chelating amine, and (c) a water-immiscible diluent for (a), (b) and metal complexes of (a) and (b) to provide a solution of the first metal value in the extractant, (2) separating the thus-formed solution from the aqueous raffinate depleted in the first metal value, and (3) recovering the first metal value from the separated solution.

DETAILED DESCRIPTION

The alkyl aromatic sulfonic acids (a) used in the extractant system and the process of the present invention can vary widely in chemical nature, so long as they have a minimum molecular weight of at least about 400 and at least one, and preferably two, alkyl groups on the aromatic sulfonic acid nucleus. If a phenyl nucleus is present, these requirements can be met with a benzene sulfonic acid containing at least two alkyl groups having a total of 20 carbon atoms, e.g., didecylbenzenesulfonic acid, or four alkyl groups having a total of 20 carbon atoms, e.g., tetrapentylbenzenesulfonic acid; the alkylaromatic polysulfonic acids should also have a ratio of molecular weight to number of sulfonic acid groups of at least 400:1. Instead of a monocyclic, i.e., phenyl nucleus, the nucleus can be polycyclic, e.g., naphthalene, anthracene, phenanthrene, tetrahydronaphthalene, etc. Many variations in the position of substitution are possible and contemplated and mixed positional isomers are included. The alkyl substituents can be straight or branched chain. Additional groups such as hydroxy, ether, halogens, etc., can also be present. Best results are obtained with maximum variations in substituent locations and with maximum branching.

The most preferred alkylaromatic sulfonic acids are branched polyalkyl substituted naphthalene sulfonic acids. These are made, for example, by sulfonating polyalkylnaphthalenes. The polyalkylnaphthalenes can be made by alkylating naphthalene with olefins, for example, propylene trimer or tetramer, or alkyl halides, with a suitable catalyst, e.g., hydrogen fluoride or anhydrous aluminum chloride in a suitable solvent such as naphtha, sulfur dioxide, nitrobenzene or a mixture of benzene and nitrobenzene. See U.S. Pat. No. 2,764,548. Such a process produces naphthalene substituted with alkyl groups and, if a branched olefin is used, such as propylene trimer or propylene tetramer, obtained by polymerizing propylene by an acid catalyst such as phosphoric acid, then the alkyl groups will be highly branched as well. Sulfonation is achieved by treating the polyalkylaromatic with a sulfonating agent. For example, the dialkyl aromatic compound is dissolved in an inert solvent, such as petroleum naphtha, hexane, heptane, octane, chlorinated solvents, and the like, and sulfuric acid, preferably oleum, is introduced into the solution at the desired temperature and with agitation. After reaction is complete, the sulfonic acid product is separated from any co-produced polysulfonic acid by adding water to selectively extract the polysulfonic acid, leaving the alkyl-aromatic sulfonic acid in the organic phase. Detailed techniques for preparing dinonylnaphthalene sulfonic acid, didodecylnaphthalene sulfonic acid and isomers and analogs thereof, including the benzene analogs, is described in U.S. Pat. No. 3,764,548, incorporated herein by reference.

The chelating amines (b) of the present invention are generally described as chelating agents having at least two coordinating centers in the molecule, e.g., a nitrogen, oxygen, sulfur, or like moiety, at least one of which is a nitrogen moiety incorporated into an aromatic or semi-aromatic ring, such as, for example, pyridine, oxazole or the like. Preferred chelating amines are those which have 2, and most preferably 3, nitrogen coordinating centers. Generally such chelating amines have a pKa of from about 3 to about 9, or most preferably a pKa from about 3 to about 5. Classes of chelating amines (b) which can be used in the extractant system and process of the present invention include the following:

2-Picolylamines:

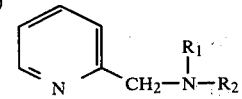

where $R_1$ = H, $C_1$-$C_{18}$ alkyl, 2-picolyl, i.e.-

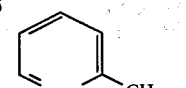

$C_1$-$C_{12}$ alkyl-substituted benzyl, —$(CH_2)_n COOR_3$, where $R_3$ = $C_1$-$C_{18}$ alkyl and n is 1 or 2; and $R_2$ = $C_1$-$C_{18}$ alkyl, $C_1$-$C_{12}$ alkylbenzyl, $C_1$-$C_{12}$ alkylphenyl, $C_1$-$C_4$ hydroxyalkyl, or

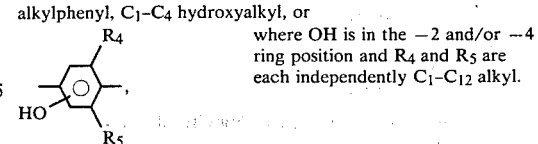

where OH is in the —2 and/or —4 ring position and $R_4$ and $R_5$ are each independently $C_1$-$C_{12}$ alkyl.

8-Aminoquinolines:

-continued

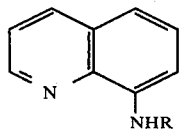
NHR where R = $C_1$-$C_{18}$ alkyl or $C_1$-$C_{12}$ alkylbenzyl.

Benzoxazoles and Benzodiazoles:

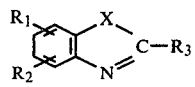

where $R_1$ and $R_2$ each independently represent $C_1$-$C_{12}$; $R_3$ = 2-pyridyl;

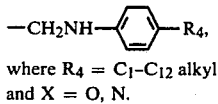

where $R_4$ = $C_1$-$C_{12}$ alkyl; and X = O, N.

Picolinic Acid Esters and Amides:

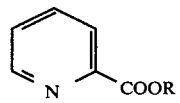

where R = $C_1$-$C_{30}$ alkyl;

or

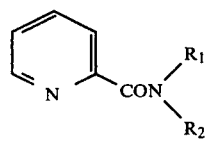

where each $R_1$ and $R_2$ independently represent H or $C_1$-$C_{12}$ alkyl.

Pyridyl Imidazoles:

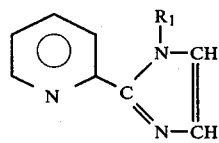

where $R_1$ is a $C_1$ to $C_{18}$ alkyl which can optionally bear a hydroxy group on the second carbon, $C_1$ to $C_{12}$ alkyl-substituted benzyl, —$(CH_2)_n COOR_3$, where $R_3$ = $C_1$-$C_{18}$ alkyl and n is 1 or 2; and

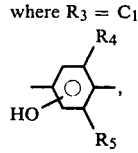

where OH is in the —2 and/or —4 ring position and $R_4$ and $R_5$ are each independently $C_1$-$C_{12}$ alkyl.

Pyridyl Imidazolines:

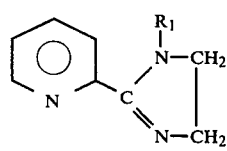

where $R_1$ is $C_1$-$C_{14}$ alkyl or alkylbenzyl, $C_1$-$C_{12}$ alkyl-substituted benzyl, —$(CH_2)_n COOR_3$, where $R_3$ = $C_1$-$C_{18}$ alkyl and n is 1 or 2; and

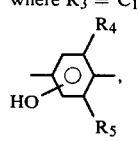

wherein OH is in the —2 and/or —4 ring position and $R_4$ and $R_5$ are each independently $C_1$-$C_{12}$ alkyl.

Pyridyl Tetrahydropyrimidines:

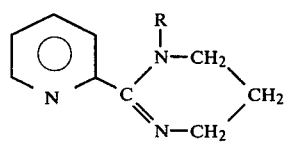

where R = $C_1$-$C_{14}$ alkyl, $C_1$-$C_{12}$ alkyl-substituted benzyl, —$(CH_2)_n COOR_3$, where $R_3$ = $C_1$-$C_{18}$ alkyl and n is 1 or 2; and

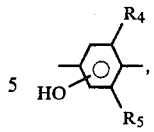

where OH is in the —2 and/or —4 ring position and $R_4$ and $R_5$ are each independently $C_1$-$C_{12}$ alkyl.

Oxazoles:

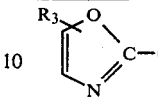

where $R_3$ = $C_1$-$C_{12}$ alkyl, phenyl, $C_1$-$C_{12}$ alkylphenyl, $C_1$-$C_{12}$ alkoxy or H in the 4- or 5-ring position; $R_2$ = $C_1$-$C_{12}$ alkyl, $C_1$-$C_{12}$ alkylphenyl, $C_1$-$C_{12}$ alkylbenzyl; and $R_1$ =

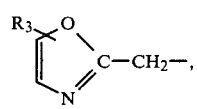

or H.

In the foregoing formulas, the alkyl moieties can be straight- or branched-chain and the benzyl, pyridyl and phenyl moieties can also be further substituted with moieties which are not detrimental to the activity of the compound as part of the extractant system described herein. The foregoing classes are illustrative of those which can be used in the present invention and are either readily available or can be prepared by those skilled in the art according to methods known in the art or by procedures obvious therefrom. For example, 2-picolylamines are generally taught in Weissburger, "The Chemistry of Heterocyclic Compounds", Vol. 14, New York, 1961, and Elderfield, "Heterocyclic Compounds", Vol. 1, 1950. Pyridyl imidazolines and tetrahydropyrimidines can be prepared by the methods of Oxley and Short, J. Chem. Soc. (1947), p. 497.

A wide variety of water-immiscible organic solvents (diluents), in which the extraction reagents (a) and (b) are dissolved, can be employed according to this invention. The minimum requirements for the diluent (c), however, are that the diluent be substantially water-immiscible, that it will dissolve the extraction reagents in appreciable amounts, e.g., at least about 10-20% and preferably higher, and that it will not interfere with the function of the reagent in extracting the metal values from acid solutions. These diluents can be aliphatic or aromatic hydrocarbons, halogenated hydrocarbons, petroleum, derivatives, ethers, etc. Examples of these various diluents include toluene, carbon tetrachloride, benzene, xylene, fuel oil, chloroform, 2-ethyl-hexanol, and particularly kerosene.

Usually, the chelating amine extractant will be present in the organic phase in an amount sufficient to extract at least a portion of the first metal values, e.g., copper, nickel or cobalt, from the aqueous solutions containing the same. Preferably, the chelating amine will be present in an amount of from about 2 to about 40% by weight based on the total organic phase, with an amount of from about 5 to about 20% by weight being particularly preferred. The chelating amines employed in the present invention are strong bases and typically have a pKa of from about 3 to about 7.5, preferably from about 3 to about 5. Preferred chelating amines include the picolylamines, oxazoles, benzoxazoles, pyridyl imidazoles, and the picolinic acid amides and esters. Highly preferred chelating amines are the picolylamines, particularly N-(p-dodecylbenzyl)-bispicolylamine, pyridyl imidazoles, and the picolinic acid amides and esters.

In a preferred embodiment of the present invention, the extractant system comprises (a) dinonylnaphthalene sulfonic acid and (b) N-(p-dodecylbenzyl)-bis-picolylamine in a water-immiscible diluent, (N,N-bis-(2-ethylhexyl)-picolinamide, hexadecyl picolinate, or 3'-dodecyl-2-(2-pyridyl)-imidazole).

In a preferred embodiment, the extractant system and process of the invention are employed to selectively extract nickel from a feed solution containing the same and at least one other metal value. In another preferred embodiment, the extractant system and process of the invention are employed to selectively extract cobalt from a feed solution containing the same and at least one other metal value. In still another preferred embodiment, the extractant system and process of the invention are employed to selectively extract copper from a feed solution containing the same and at least one other metal value. In the latter embodiment, copper is preferably selectively extracted from iron in the feed solution.

In practicing the process of the invention, the sulfonic acid compound (a) and the chelating amine (b) can be employed in mole ratios from about 2:1 to about 1:5. Molar amounts of sulfonic acid in excess of the general ratios (i.e., greater than 2) are not generally desirable as loss of selectivity will usually occur. Excess molar amounts of the chelator (i.e., ratios less than 1) will generally result in improved extraction selectivity. In most instances, an excess of (b) will be employed, with an acid/amine ratio in the range of from about 1:1 to about 1:3 being preferred. In one embodiment of the invention, a mole ratio of (a):(b) of about 1:2 is employed for optimum extractant results. The total concentration of (a) and (b) together in the extractant system is usually in the range of from about 0.1 to about 1.2 molar in order to provide adequate capacity without encountering solution viscosity problems. Preferably, the concentration of (b) exceeds that of (a); most preferably the concentration of (b) is about 0.5 molar or more.

While the volumetric phase ratios of the extractant system to the aqueous solution can vary depending upon several factors such as the amount of the first metal value present in the aqueous phase, the concentrations of (a) and (b) in the organic phase, etc., volumetric phase ratios of from about 1:3 to about 3:1 will generally be employed. These ratios will extract essentially all of the first metal from the aqueous within a small number of extraction stages, e.g., 5 or less. In continuous column extractors or similar equipment, 5 or fewer contacts or theoretical plates will normally suffice. Under most circumstances, an extraction or contacting period per stage of at most five minutes is sufficient, although the extraction time usually may be reduced to 1 to 2 minutes, and often 30 seconds or less.

The organic phase to aqueous phase volume ratio can be varied broadly and the most efficient ratio in each case can be readily determined by one skilled in the art. The particular ratio selected for any given extraction may depend upon the extraction reagent, diluent, and type of metal bearing solution employed as well as their concentration and the method of mixing them, and the like.

The extractant system may be contacted with the metal containing aqueous feed by any of the well-known procedures employed in solvent-extractions. While continuous countercurrent methods are preferred, batch, continuous bath, and batch countercurrent methods may also be used. The liquid-liquid contacting means may comprise a pulse column, a countercurrent rotating disc column, and other known systems. Mixing may be carried out at conventional temperatures, advantageously in the range of about 10° to 40° C.

The extraction generally will take place at a pH of below about 3.5, generally between about 0.75 and 3.0 and preferably in the range of 1.5 to 2.5. The following approximate pH ranges are preferred for the indicated feed solutions: copper and iron—0.9-2.0; nickel and iron, 1.0-3.0; nickel and cobalt 1.5-3.0; copper and nickel, 1.0-2.5; copper and cobalt, 1.0-3.0; copper and zinc, 1.0-2.0; and nickel and zinc, 1.0-2.5. Preferably, nickel or cobalt are extracted from a feed solution according to the present invention at a pH of about 3.0 or less.

After the first metal values have been transferred to the organic phase and the aqueous and organic phases separated, the organic phase containing the first metal value is stripped in any suitable liquid-liquid contractor. In the stripping operation, the first metal containing organic phase is contacted with 10 to 150% by volume of a mineral acid, e.g., sulfuric, nitric or hydrochloric, the choice of acid depending on the anion component of the metal salt desired. Equipment and methods useful in commercial stripping practice are well known and are described in Mining Engineering, 17, pp. 76-80, December, 1965, which is incorporated herein by reference.

In a commercial operation, the aqueous feed and the extractant solutions are fed in the desired ratio into a small agitated mixer. After mixing for one to two mixtures, or less, the mixture overflows to and resides in a settler for a period of about five minutes. The phases are then separated continuously, the aqueous raffinate being drawn off and the organic layer transferred to an agitated stripper vessel where acid is added and mixed for about one to two minutes or less. The mixture is then transferred to a settler where, after a few minutes, the phases are separated.

Those skilled in the art will understand that the various extractant systems described herein are not equal in activity but will vary depending upon the components (a) and (b) being employed, the amounts of each and the mole ratio of the same, the content of the particular leach liquor being employed, the metal value desired to be extracted, the contact time, equipment, and other known factors. The optimum operating conditions for any particular extractant system and use thereof can, however be readily determined according to procedures set forth herein and in the known art.

The following examples illustrate the process of the present invention, but are not intended to limit it in any manner whatsoever.

EXAMPLE 1

In testing extractant systems of the present invention, known techniques such as generally described hereinbelow are employed.

Reagent grade metal sulfate salts and sulfuric acid were used to prepare aqueous stock solutions (synthetic leach) containing about 1 gram/liter each of two or more various metal ions, such as cupric copper, ferric, nickel, cobalt and/or aluminum ions. Equal aliquots of the metal ion stock solutions desired are then mixed and either dilute sulfuric acid, water, or dilute sodium carbonate solutions are added to give a final aqueous volume of about 60 milliliters (ml) and an initial pH in the range of 2 to 5. This solution is then mixed with 20 ml of an extractant system comprising a solution of the chelating amine and the alkylaromatic sulfonic acid in an inert diluent and the resulting mixture is vigorously mixed by using mechanical agitation means until the equilibrium pH of the mixture is attained. The two phases are then carefully separated, with the organic phase being stripped with sulfuric acid (1 or 3 N). The raffinate thereof is combined with the aqueous phase and the metal ion concentration thereof is determined by atomic absorption spectometry. The metal ion concentration in the organic phase is determined by the difference in concentration between the feed and aqueous raffinate concentrations. The distribution coefficient ($D_a^o$) of the organic (o) to aqueous (a) phases for each metal is then calculated.

In operations utilizing the foregoing general procedures, 20 ml of a 0.20 M solution of N-(p-dodecylbenzyl)-bis-picolylamine and 0.20 M dinonylnaphthalene sulfonic acid (DNNSA) in an aromatic hydrocarbon diluent (Chevron 3) were mixed with 60 ml of an acidic aqueous solution containing 1.0 grams per liter each of nickel, cobalt and aluminum ions, all of the sulfates and mixed for about 2–3 minutes until an equilibrium pH of about 1.6 was attained. Separation and analysis of the aqueous and organic phase as noted above gave the following results and distribution coefficients:

| Phase | Metal Ions | | |
|---|---|---|---|
| | Ni | Co | Al |
| aqueous g/l | 0.85 | 0.81 | 1.01 |
| organic g/l | 0.38 | 0.58 | 0.015 |
| $D_a^o$ | 0.45 | 0.72 | 0.015 |

From the foregoing results, it is apparent that considerable nickel and cobalt were extracted, but very little aluminum.

EXAMPLE 2

Twenty ml of a 0.20 M solution of N,N'-bis-(5-phenyl-2-oxazolylmethyl) dodecylamine and 0.20 M DNNSA in a hydrocarbon solvent (Napoleum 470), was mixed with 60 ml of the nickel/cobalt/aluminum solution of Example 1 until an equilibrium pH of 1.7 was attained. Analysis of the aqueous and organic phases gave the following results: (organic phase stripped by shaking with 3 N sulfuric acid)

| Phase | Metal Ion | | |
|---|---|---|---|
| | Ni | Co | Al |
| aqueous g/l | 0.38 | 0.80 | 1.00 |
| organic g/l | 1.65 | 0.62 | 0.03 |
| $D_a^o$ | 4.3 | 0.78 | 0.03 |

EXAMPLE 3

The same extractant system used in Example 2 was mixed with 60 ml of a solution containing 1 gram/l of Cu (II) and 1 gram/l Fe (III) until an equilibrium pH of 1.55 was attained. Analysis of the organic and aqueous phases gave the following results: (organic phase stripped by shaking with 3 N sulfuric acid)

| Phase | Metal Ion | |
|---|---|---|
| | Cu | Fe |
| aqueous g/l | 0.078 | 1.039 |
| organic g/l | 2.76 | 0.016 |
| $D_a^o$ | 36 | 0.016 |

The selectivity (ratio of distribution coefficients) of Cu to Fe is about 2100.

EXAMPLE 4

In the manner of Example 1–3, other extractant systems using a variety of chelating amines (0.2 M concentration) were employed with 0.2 M DNNSA in an inert diluent in treating various aqueous feeds containing 1 gram/l each of the metal ions (Cu (II) and Fe (III)) noted in the Table below. The results of such operations, including the equilibrium pH and distribution coefficients, are set forth below in Table I:

TABLE I

| No. | Chelating Amine | Diluent | Final pH | $D_a^o$ Metal Ion | | | | |
|---|---|---|---|---|---|---|---|---|
| | | | | Cu | Fe | Ni | Co | Al |
| 1 | (a) N-picolyl-p-(n-butyl) aniline | Toluene | 1.6 | 9.0 | 0.08 | 0.9 | 0.08 | — |
| | (b) N-picolyl-p-(n-butyl) aniline | Toluene | 1.0 | 11.5 | 0.007 | — | — | — |
| | (c) N-picolyl-p-(n-butyl) aniline | Toluene | 1.7 | 132. | 0.01 | — | — | — |
| 2 | N-(n-butyl)-8-aminoquinoline | A | 1.6 | 2.8 | 0.13 | — | — | — |
| 3 | 2-(phenylaminomethyl)-4,6-di-t-butyl-benzoxazole | Toluene | 1.7 | 47.0 | 0.3 | 1.4 | 0.7 | — |
| 4 | 1-Benzyl-2-(2-pyridyl)-imidazoline | A | 1.6 | 2.5 | 0.17 | — | — | — |
| 5 | N-picolyl-1-cyano-2-ethylhexylamine | A | 1.7 | 7.5 | 0.3 | — | — | — |
| 6 | N-picolyl-1-cyano-2-ethylhexylamine | A | 2.2 | — | — | 1.2 | 0.28 | 0.22 |
| 7 | (a) N-picolyl-N-methyl-4-hydroxy-3,5-di-t-butyl benzylamine) | A | 1.5 | 2.4 | 0.01 | — | — | — |
| | (b) N-picolyl-N-methyl-4-hydroxy-3,5-di-t-butyl benzylamine) | A | 1.5 | — | — | 0.055 | 0.037 | — |
| | (c) N-picolyl-N-methyl-4-hydroxy-3,5-di-t-butyl benzylamine) | A | 3.9 | — | — | 0.67 | 0.045 | — |
| 8 | N-picolyl glycine, -2,6-dimethylheptyl ester | A. | 1.6 | 130.0 | 0.012 | — | — | — |
| 9 | N-picolyl glycine, -2,6- | A | 1.8 | — | 0.46 | 1.8 | 1.0 | — |

TABLE I-continued

| No. | Chelating Amine | Diluent | Final pH | $D_a°$ Metal Ion Cu | Fe | Ni | Co | Al |
|---|---|---|---|---|---|---|---|---|
| | dimethylheptyl ester | | | | | | | |
| 10 | N-picolyl-4-hydroxy-3,5-di-t-butyl benzylamine | A | 3.2 | — | — | 4.4 | 0.38 | 0.56 |
| 11 | N-((3,5-di-t-butyl)-4-hydroxybenzyl)-bis-picolylamine | A | 2.2 | — | — | 2.9 | 2.2 | .007 |
| 12 | Picolinic acid, 2-octyl ethyl ester | A | 1.6 | 10.7 | 0.3 | — | — | — |
| 13 | Picolinic acid, 2-octyl ethyl ester | A | 1.6 | — | 0.6 | 2.3 | 1.3 | — |
| 14 | N-tridecyl picolinamide | A | 1.5 | 1000 | 2.3 | — | — | — |
| 15 | N,N-dibutyl picolinamide | A | 1.5 | 15 | 0.67 | — | — | — |
| 16 | N,N-dibutyl picolinamide | A | 1.5 | — | 0.7 | 2.1 | 0.7 | — |
| 17 | N-(2-hydroxydodecyl)-2-(2-pyridyl)imidazole | A | 1.6 | 230 | 0.004 | — | — | — |
| 18 | N-(2-hydroxydodecyl)-2-(2-pyridyl)imidazole | A | 2.1 | — | — | 0.5 | 1.23 | 0.024 |
| 19 | (a) N-picolyl glycine, dodecyl ester | A | 2.7 | — | — | 0.49 | 0.41 | 0.004 |
| | (b) N-picolyl glycine, dodecyl ester | A | 3.5 | — | — | 4.3 | 12.1 | 0.003 |
| 20 | (a) N-picolyl glycine, hexadecyl ester | A | 1.9 | — | — | 2 | 0.01 | 0.002 |
| | (b) N-picolyl glycine, hexadecyl ester | A | 2.9 | — | — | 18 | 0.8 | 0.01 |

*A = NAPOLEUM 470 (Kerr McGee Corp.)
Where a specific equilibrium pH was desired dilute (ca 1N) sulfuric acid or sodium hydroxide was added until the desired pH was obtained and remained constant for 5 minutes.

EXAMPLE 5

The extractant system of Run No. 11, Example 4 was used in studies to determine the effect of a different inert diluent and different amine/DNNSA concentrations on the extraction distribution coefficients of the metal ions. In such operations, use of the extractant system of Run No. 11 in a completely aromatic hydrocarbon diluent in place of diluent A at equilibrium pH 2.2 increased the $D_a°$ of nickel from 2.9 to 11, and of cobalt from 2.2 to 2.3, with no increase in nickel extraction. On the other hand, use of excess DNNSA to amine (concentration decreased from 0.2 to 0.1 M) at an equilibrium pH of 1.7 lowered both the nickel (from 2.9 to 2.2) and cobalt (from 2.2 to 0.7) distribution coefficients and undesirably increased the aluminum $D_a°$ from only 0.007 to 0.7. Similar effects were likewise observed when the amine concentration of the extractant system of Run No. 6, Example 4 was decreased to 1.0 M.

EXAMPLE 6

Twenty milliliters of an extractant system comprising 2-ethylhexylpicolinate (0.21 M) and DNNSA (0.2 M) in Napoleum 470 was shaken with 60 ml of an aqueous solution containing Ni, 3.6 grams/l; Co, 0.16 grams/l; Fe (III), 1.7 grams/l; Mg, 7.1 grams/l; Al, 1.4 grams/l and Mn, 2.9 grams/l. The phases were separated and the organic phase stripped with 20 ml of 3 N sulfuric acid and both aqueous phases analyzed. This procedure was repeated twice using organic to aqueous phase ratios of 2:1 and 1:1 in place of the initial 1:3 phase ratio and the results of all three runs are as follows:

| | O:A Phase Ratio | Equil. pH | % Metal Ion Extracted | | | | | |
|---|---|---|---|---|---|---|---|---|
| | | | Ni | Co | Fe | Al | Mg | Mn |
| (a) | 1:3 | 1.9 | 28 | 10 | 7 | 1 | 1 | 2 |
| (b) | 1:1 | 1.9 | 70 | 30 | 6 | — | — | — |
| (c) | 2:1 | 2.0 | 90 | 62 | 22 | — | — | — |

The foregoing data indicate higher rates of extraction are achieved as the ratio of organic to aqueous phase is increased. However, those skilled in the art recognize that the extraction values obtained with higher aqueous to organic phase ratios of the extractant system are sufficient to design and operate a countercurrent extract unit which, for example, will afford high nickel and cobalt recovery values.

EXAMPLE 7

Twenty ml of a 0.2 M solution of DNNS and 0.6 M in 3'-dodecyl-2'-(2-pyridyl)-tetrahydropyrimidine in Napoleum 470 was stirred with 60 ml of an aqueous solution containing 1 g/l each of nickel, cobaltous, and aluminum ions as sulfates. The equilibrium pH was 1.9. The organic phase was separated and stripped with 20 ml of 3 N sulfuric acid. Both aqueous phases were analyzed, giving the following distribution coefficients: nickel, 1.17; cobalt, 0.18; aluminum, 0.10.

What is claimed is:

1. A process for recovering a first metal value selected from the group consisting of cobalt, copper and nickel from an acidic, aqueous ore leach liquor containing said first metal value and a second metal value, the process comprising (1) contacting said leach liquor at a pH of below about 3.5 with a solvent-extractant system comprising:
    (a) an alkylaromatic sulfonic acid having a molecular weight of at least about 400,
    (b) a chelating amine wherein the pKa value for the amine group is in the range of from about 3 to about 9 and further having at least two coordinating centers in the molecule, at least one such center being a ring nitrogen, and
    (c) a water-immiscible diluent for (a), (b) and metal complexes of (a) and (b) to provide a solution of the first metal value in the extractant, said combination of (a) and (b) being characterized as having superior selectivity for said first metal value over (b) alone, (2) separating the thus-formed solution from the aqueous raffinate depleted in the first metal value, and (3) recovering the first metal value from the separated solution.

2. The process of claim 1 wherein component (b) has a pKa of from about 3.0 to about 5.0.

3. The process of claim 1 wherein component (b) is selected from the group consisting of picolylamines, oxazoles; benzoxazoles; pyridyl imidazoles and picolinic acid esters and amides.

4. The process of claim 1 wherein component (b) is a picolylamine; a pyridyl imidazole or a picolinic acid ester or amide.

5. The process of claim 1 wherein component (a) is a branched polyalkyl substituted naphthalene sulfonic acid.

6. The process of claim 5 wherein component (b) is a picolylamine; a pyridyl imidazole or a picolinic acid ester or amide.

7. The process of claim 6 wherein (a) is dinonylnaphthalene sulfonic acid and (b) is N-(dodecylbenzyl)-bis-picolylamine.

8. The process of claim 1 wherein nickel is the metal value selectively extracted from a solution containing the same and a second metal value.

9. The process of claim 5 wherein nickel is the metal value selectively extracted from a solution containing the same and a second metal value.

10. The process of claim 1 wherein cobalt is the metal value selectively extracted from a solution containing the same and a second metal value.

* * * * *

UNITED STATES PATENT AND TRADEMARK OFFICE
CERTIFICATE OF CORRECTION

PATENT NO. : 4,254,087
DATED : March 3, 1981
INVENTOR(S) : Robert R. Grinstead

It is certified that error appears in the above—identified patent and that said Letters Patent is hereby corrected as shown below:

Column 6, lines 32 and 33, "mixtures" should be -- minutes --;

Column 12, Claim 7, line 5, last word should be
-- N-(p-dodecylbenzyl)-bispicolylamine --.

Signed and Sealed this

*Seventh* Day of *July 1981*

[SEAL]

*Attest:*

RENE D. TEGTMEYER

*Attesting Officer*     *Acting Commissioner of Patents and Trademarks*